(12) United States Patent
Davenel

(10) Patent No.: US 11,262,166 B2
(45) Date of Patent: Mar. 1, 2022

(54) OPTICAL RADIATION-COLLECTING ASSEMBLY FOR A HOMING DEVICE FOR GUIDING A ROCKET

(71) Applicant: SAFRAN ELECTRONICS & DEFENSE, Paris (FR)

(72) Inventor: Arnaud Davenel, Boulogne-Billancourt (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/287,418

(22) PCT Filed: Oct. 8, 2019

(86) PCT No.: PCT/FR2019/052381
§ 371 (c)(1),
(2) Date: Apr. 21, 2021

(87) PCT Pub. No.: WO2020/084217
PCT Pub. Date: Apr. 30, 2020

(65) Prior Publication Data
US 2021/0356232 A1    Nov. 18, 2021

(30) Foreign Application Priority Data

Oct. 23, 2018 (FR) ..................................... 1801130

(51) Int. Cl.
*F41G 7/22* (2006.01)
*G02B 17/06* (2006.01)
*F41G 7/00* (2006.01)

(52) U.S. Cl.
CPC .......... *F41G 7/2253* (2013.01); *F41G 7/2293* (2013.01); *G02B 17/061* (2013.01)

(58) Field of Classification Search
CPC .... F41G 7/2253; F41G 7/2293; G02B 17/061
See application file for complete search history.

(56) References Cited

U.S. PATENT DOCUMENTS 3,935,818 A * 2/1976 Johnson ................. F41G 7/2253
                                                        102/213
5,182,564 A * 1/1993 Burkett .................. F41G 7/2253
                                                        342/53
(Continued)

OTHER PUBLICATIONS

International Search Report dated Feb. 28, 2020, issued in corresponding International Application No. PCT/FR2019/052381, filed Oct. 8, 2019, 2 pages.
(Continued)

*Primary Examiner* — Bernarr E Gregory
(74) *Attorney, Agent, or Firm* — Christensen O'Connor Johnson Kindness PLLC

(57) ABSTRACT

An optical radiation-collecting assembly includes a convex mirror, a concave mirror with a central opening and a window, arranged such that light passes through the opening in the concave mirror, is reflected first by the convex mirror and then by the concave mirror, and subsequently passes through the window. The optical assembly is suitable for use in a homing device for guiding a rocket, preventing an optical input component of such a device from being damaged and rendered inoperative from abrasion when exposed to a high-speed air flow containing dense particles. The optical assembly also includes an image-forming function.

13 Claims, 1 Drawing Sheet

(56) References Cited

U.S. PATENT DOCUMENTS

| | | | | |
|---|---|---|---|---|
| 5,327,149 | A * | 7/1994 | Kuffer | F41G 7/2253 |
| | | | | 342/53 |
| 8,502,128 | B1 * | 8/2013 | Streuber | F41G 7/2293 |
| | | | | 244/3.16 |
| 9,696,117 | B2 * | 7/2017 | Miller | F41G 7/2253 |
| 2006/0152705 | A1 | 7/2006 | Yoshida et al. | |
| 2010/0108800 | A1 * | 5/2010 | Mayer | F41G 7/2293 |
| | | | | 244/3.16 |
| 2010/0127113 | A1 | 5/2010 | Taylor et al. | |
| 2010/0327105 | A1 | 12/2010 | Eckhardt | |
| 2014/0014765 | A1 | 1/2014 | Sancho Ponce et al. | |

OTHER PUBLICATIONS

Written Opinion of the International Searching Authority dated Feb. 28, 2020, issued in corresponding International Application No. PCT/FR2019/052381, filed Oct. 8, 2019, 5 pages.

* cited by examiner

OPTICAL RADIATION-COLLECTING ASSEMBLY FOR A HOMING DEVICE FOR GUIDING A ROCKET

TECHNICAL FIELD

The invention relates to a radiation-collecting optical assembly for a seeking device for guiding a self-propelled machine.

PRIOR ART

A self-propelled machine such as a missile is provided with a seeking device that automatically guides the autonomous travel of the machine toward a point of origin of a radiation. This point of origin may be a source of thermal radiation that is used as target, or a spot of light produced by a target-designating laser beam.

Such a seeking device has an optical entrance that is intended to collect, during its operation, radiation coming from the target. However, this optical entrance is exposed to the external environment during the travel of the self-propelled machine, and possibly also beforehand during transportation of the machine by a carrier. Such is the case for a missile intended to travel at high speed, and possibly also to be transported beforehand by an airplane. Components that are useful to the operation of the seeking device and that are located at its optical entrance are thus exposed to a high-speed flow of air and of dense particles. These particles, such as dust, grains of sand suspended in the air or raindrops, abrade components that are located at the optical entrance of the seeking device, so that these components may become unable to perform their function within the seeking device, causing the latter to malfunction.

Such is the case for an optical objective lens that is used in a seeking device to collect radiation originating from a target.

Several methods have thus already been used to decrease or avoid such malfunctions.

A first known method, such as disclosed in document US 2010/0127113, consists in using a window with a high abrasion resistance and high thermal resistance, a sapphire window for example, in front of the optical entrance of the seeking device. However, such a window is generally not transparent to thermal radiation with a wavelength of about 10 µm (microns). This first method is therefore incompatible with certain applications of seeking devices.

Other methods consist in protecting the optical entrance of the seeking device during its transportation by the carrier aircraft. Certain of these other methods especially consist in using an ejectable cap or a case for the seeking device during transportation by the carrier aircraft, then in removing this cap or case just before the seeking device is brought into operation. However, such methods are expensive and increase the total mass transported by the carrier aircraft. Furthermore, they do not improve an imaging result that is obtained by the optical system of the seeking device when it is subjected to the high-speed flow of air and particles.

TECHNICAL PROBLEM

Starting from this situation, one object of the present invention is to ensure correct operation of a seeking device which has an optical entrance that is exposed to a high-speed flow of air and particles, without the drawbacks of the prior-art methods that were just reminded.

SUMMARY OF THE INVENTION

To achieve this or another object, a first aspect of the invention provides a new radiation-collecting optical assembly that is designed to form the optical entrance of a seeking device for guiding a self-propelled machine. This collecting optical assembly comprises, according to the invention:

- a convex mirror, which has a reflecting face and an optical axis;
- a concave mirror, which is placed in front of the reflecting face of the convex mirror and facing this latter, the concave mirror being provided with an aperture through its central portion, the concave and convex mirrors having same optical axis, and this optical axis passing through the aperture of the concave mirror at a central point thereof; and
- at least one window that is transparent to the radiation, and that extends behind the convex mirror, on a side opposite its reflecting face.

According to a first additional feature of the invention, the device is designed so that part of the electromagnetic radiation that passes through the aperture of the concave mirror in direction of the convex mirror is reflected by this convex mirror then by the concave mirror, then passes through the window, and then propagates behind the convex mirror.

According to a second additional feature of the invention, the device is further designed so that a fluid that passes through the aperture of the concave mirror in direction of the convex mirror is deviated in front of this convex mirror, thereby acquiring a radial velocity component that is divergent with respect to the optical axis, and then flows between the window and the concave mirror.

Thanks to using the convex mirror as an optical-component surface that is exposed first to the external fluid, i.e. exposed to air which may be at high speed and contain dense particles in suspension, no spectral transparency constraint is placed on this optical component. It is thus easier to select for this convex mirror, a material which has sufficient abrasion resistance and sufficient thermal resistance.

In particular, at least one portion of the convex mirror which is efficient for reflecting the radiation may be comprised of a solid portion of uniform material with a thickness larger than 0.5 mm (millimeter), or even larger than 1 mm. Put another way, the convex mirror may be at least partially out of bulk material.

After having been reflected by both mirrors, the radiation passes through the window, and hence other optical components that are placed downstream of the window with respect to the direction of propagation of the radiation, are not exposed to the flow of the external fluid. In addition, since the reflecting face of the concave mirror is turned away from the direction in which the external fluid reaches the collecting assembly, it is not subjected to the impacts of the dense particles contained in this external fluid. For this reason, the concave mirror is not subject to degradation by abrasion of its reflecting face.

According to a third additional feature of the invention, the convex and concave mirrors may be designed and placed so that electromagnetic radiation that passes through the aperture of the concave mirror parallel to the optical axis, is focused by the collecting optical assembly on an image point that is located on this optical axis behind the convex mirror. Put another way, the radiation-collecting assembly of the invention directly forms an imaging system. No recovery imager or re-imaging system needs then to be used downstream of the collecting optical assembly with respect to the direction of propagation of the radiation. A weight saving and a manufacturing gain result.

In various advantageous configurations compatible with the invention, the at least one window may be symmetrically distributed about the optical axis, or may comprise a plurality of windows that are symmetrically distributed about the optical axis.

Furthermore, depending on the application of the seeking device, the mirrors and the window may be designed so that the collecting optical assembly is efficient for collecting electromagnetic radiation having at least one wavelength comprised between 2 μm (micrometer) and 2.5 μm, or between 3 μm and 5 μm, or even between 8 μm and 14 μm.

A second aspect of the invention provides a seeking device for guiding a self-propelled machine, which device comprises:

- a radiation-collecting optical assembly according to the first aspect of the invention;
- at least one optical detector, which is arranged to receive the radiation that has passed through the aperture of the concave mirror, that has been reflected by the convex mirror then by the concave mirror, and then that has passed through the at least one window;
- a control unit, this control unit being designed to determine a direction of origin of the radiation as existing before this radiation reaches the collecting optical assembly, based on at least one signal that is outputted by the optical detector, and being designed to control an orientation of a travel speed of the machine depending on the direction determined for the origin of the radiation; and
- at least one evacuation aperture, this evacuation aperture being arranged to evacuate the fluid that has passed through the aperture of the concave mirror in direction of the convex mirror, and that has flowed between the window and the concave mirror.

Preferably, the collecting optical assembly and the optical detector may be arranged and designed so that the seeking device has a large entrance optical field. In particular, an apex half-angle of the entrance optical field may be larger than 10°, preferably larger than 15°, and even more preferably larger than 18°.

The optical detector may be in particular a four-quadrant detector, or a radiation detector that is provided with a rotating apertured mask. However, it may preferably be a matrix-array image sensor that is placed in an imaging focal plane. Then, when the collecting optical assembly itself produces the function of forming the image to be captured, the matrix-array image sensor may be placed in the focal plane of the collecting optical assembly.

Lastly, a third aspect of the invention provides a self-propelled machine that comprises a seeking device according to the second aspect of the invention, and that is arranged to automatically guide a travel of the machine toward a point of origin of the radiation. According to the invention, the machine comprises an evacuation passage arranged to guide, toward an exhaust outlet of the machine, fluid coming from the evacuation aperture of the seeking device, so that the fluid has, at the exhaust outlet, a velocity component that is oriented in the same direction as a velocity of the fluid through the aperture of the concave mirror.

BRIEF DESCRIPTION OF THE DRAWINGS

Features and advantages of the present invention will become more clearly apparent from the detailed description below of non-limiting examples of embodiments, which is given with reference to the appended figures, in which.

DETAILED DESCRIPTION OF THE INVENTION

For clarity sake, the dimensions of the elements that are shown in these figures do not correspond either to actual dimensions, or to ratios of actual dimensions. Furthermore, certain of these elements have only been represented symbolically, and identical references featuring in different figures designate elements that are identical or that have identical functions.

Figure 1:
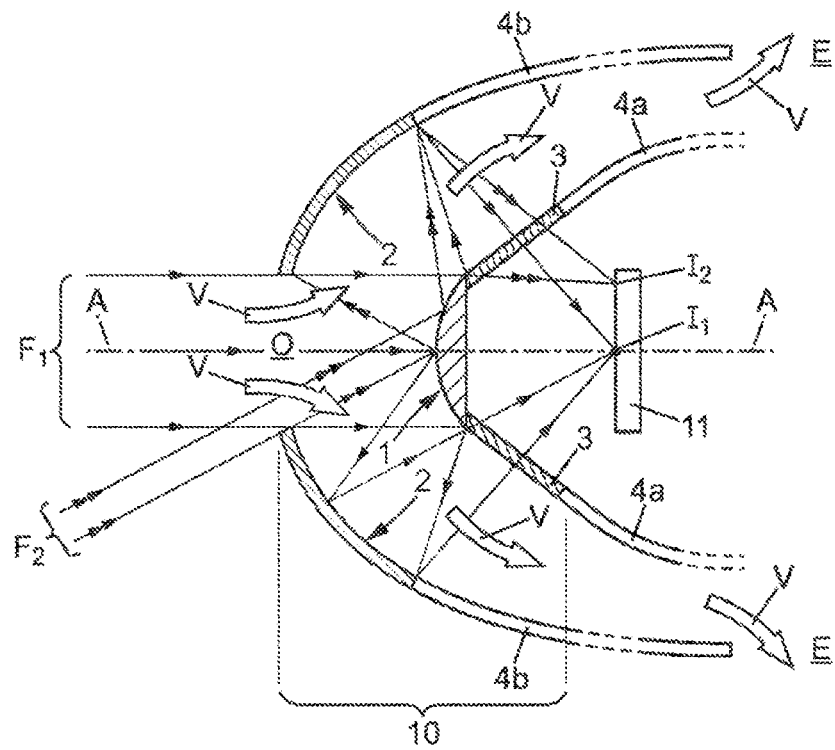
FIG. 1 is a longitudinal cross-sectional view of a radiation-collecting optical assembly according to the invention.

In FIG. 1, a radiation-collecting optical assembly 10 comprises a convex mirror 1 and a concave mirror 2 comprising a central aperture. The optical assembly 10 has an optical axis A-A, which is superposed on respective axes of the concave mirror 2, of its aperture which has been designated by reference O, and of the convex mirror 1. The assembly 10 that is thus formed has a focal plane in which it forms an image from a beam of incident rays that passes through the aperture O of the concave mirror 2, and that then is reflected by the convex mirror 1 then by the concave mirror 2. When the beam of incident rays initially has a parallel-beam structure, before penetrating through the aperture O, the rays of this beam converge on a point of the focal plane that depends on the direction of origin of the beam. In FIG. 1, a first beam $F_1$ has been shown that originates from a direction parallel to the optical axis A-A, and that converges on the point $I_1$ of the focal plane. A second beam $F_2$ possesses a direction of origin that is inclined with respect to the optical axis A-A, and converges on the point $I_2$ of the focal plane. Thus, the place of convergence, in the focal plane of the collecting assembly 10, of an incident beam of radiation is information representative of the direction of origin of this beam. An image sensor 11 may then be placed in the focal plane, in order to convert into two-dimensional coordinates the direction of origin of each beam of radiation that passes through the aperture O of the concave mirror 2.

Possibly, re-imaging optics (not shown) may be intermediate between the concave mirror 2 and the image sensor 11, behind the convex mirror 1. However, it may be preferable in certain applications, to decrease weight and cost, not to use such re-imaging optics.

The focal plane of the optical assembly 10 is perpendicular to the optical axis A-A, and located behind the convex mirror 1, on a side thereof that is opposite the aperture O of the concave mirror 2. The image sensor 11 is therefore also located behind the convex mirror 1. Thus, the rays of the beams of radiation that are collected by the optical assembly 10 intersect a mid-plane of the convex mirror 1 beyond a peripheral edge of this convex mirror 1, after having been reflected by the concave mirror 2. A window 3, which for example has the shape of an axisymmetric truncated cone, may be placed around the peripheral edge of the convex mirror 1, so as to be passed through by the rays of the collected beams as they converge toward the focal plane of the collecting assembly 10. The front of the window 3 may be connected in a seal-tight manner to the peripheral edge of the convex mirror 1, at the small end of the truncated cone, and the rear of the window 3 may be connected, again in a seal-tight manner, to a chamber wall 4a. Thus, the image sensor 11, associated electronics and other components may be contained in a chamber C that is closed upstream by the convex mirror 1 and the window 3.

The window 3 is transparent in a spectral band of sensitivity of the image sensor 11, and the mirrors 1 and 2 are selected to each have a high reflectance in this spectral band. For example, this spectral band may extend between 2 μm and 2.5 μm, or between 3 μm and 5 μm, or even between 8 μm and 14 μm, in terms of wavelength of the radiation to be detected. The spectral band between 8 μm and 14 μm may be suitable for detecting radiation that is produced by a thermal source. A person skilled in the art will then know how to choose for the window 3 a material that is transparent to the desired spectral band. In particular, when it is desired for the collecting assembly 10 to be efficient for electromagnetic radiation with wavelengths comprised between 8 μm and 12 μm, the window 3 may be of zinc selenide (ZnSe), of zinc sulfide (ZnS) or of germanium (Ge), or even of a chalcogenide glass, and especially of GASIR®, which is produced by Umicore.

The mirrors 1 and 2 may be made of bulk reflecting materials, for example of polished metal, and especially of stainless steel. In particular, the material that has a reflecting behaviour for the radiation, and which constitutes the optical face of each mirror, may have a thickness from half a millimeter to several millimeters. Alternatively, at least the concave mirror 2 may consist of a multilayer stack that performs a mirror function, this stack possibly being protected by an outer layer that is resistant to abrasion.

An air flow, which may have a high flow speed, and which passes through the aperture O of the concave mirror 2 in direction of the convex mirror 1, is laterally deviated by the latter, and angularly distributed so as to flow between the window 3 and the concave mirror 2. Optionally, a fairing wall 4b may be placed in the extension of the concave mirror 2, from an outer peripheral edge thereof, to guide the air flow downstream of the concave mirror 2. Thus, after having flowed between the window 3 and the concave mirror 2, the air flow flows between the chamber wall 4a and the fairing wall 4b to an evacuation aperture E. The air flow is thus radially deviated centrifugally by the convex mirror 1. The arrows indicated by letters V in the figures indicate the path of such an air flow.

Dust particles or water drops present in the air flow may strike the surface of the convex mirror 1. However, since this convex mirror 1 may be of bulk material or protected by a hard layer, it is able to resist the abrasion of its optical surface due to these dust particles or water drops. Thus, even when exposed to the high-speed air flow, the convex mirror 1 continues to reflect light effectively at least throughout a period of use of the collecting optical assembly 10.

Figure 2:
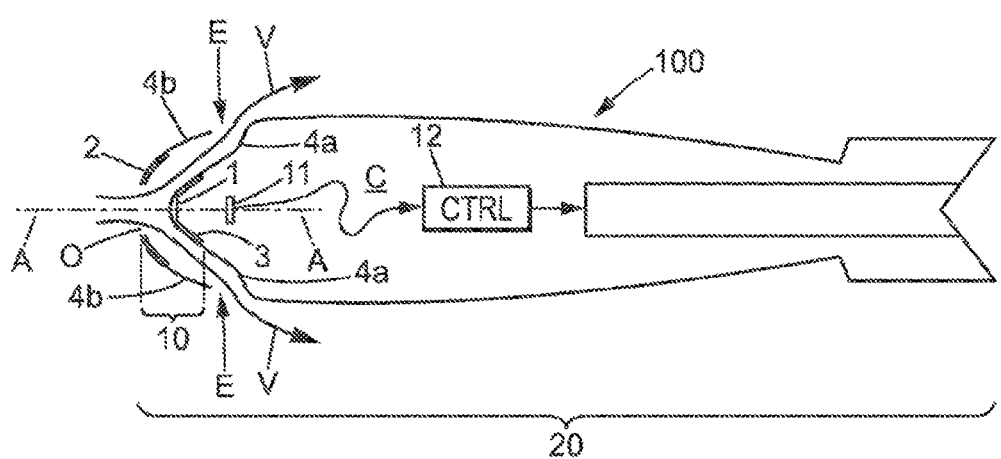
FIG. 2 is a longitudinal cross-sectional view of a self-propelled machine that comprises the radiation-collecting optical assembly of FIG. 1.

As shown in FIG. 2, the collecting optical assembly 10 and the image sensor 11 may be part of a seeking device 20 located on-board a self-propelled machine 100. The collecting optics 10 form the front end of the machine 100, with the reflecting face of the concave mirror 2 turned toward the rear of the machine 100. A control unit 12, denoted CTRL, of the seeking device 20, and other components, may be contained in the chamber C. Lastly, in a known manner, the seeking device 20 also comprises other elements (not shown) that allow the self-propelled machine 100 to be directed toward a target from which the radiation that is collected by the optical assembly 10 and then detected by the image sensor 11 originates. Since the guiding operation of such seeking device is known to those skilled in the art, it is not necessary to describe again here other aspects thereof, beyond the operation of the collecting assembly 10 that is proposed by the invention.

Depending on the application of the optical assembly 10, and especially for the application to a seeking device such as has just been described, a person skilled in the art will be able to dimension the diameters of the mirrors 1 and 2, the diameter of the aperture O, the respective curvatures of the two mirrors and their respective spacings. In particular, anyone skilled in the art will be able to select these parameters depending on an angular field and numerical aperture desired for the entrance optical system of the seeking device. Apex half-angle values for the entrance optical field that are larger than 10° or even larger than 15° or 18° are suitable for seeking-device applications.

Possibly, the seeking device 20 may be designed to detect electromagnetic radiation simultaneously in a plurality of spectral bands, or to incorporate a plurality of separate optical detection channels that are dedicated to different spectral bands. To this end, the radiations that are collected by the assembly 10 and transmitted through the window 3 may be directed toward dedicated optical detectors of the device 20, depending on the separate spectral bands to which these radiations belong. All these optical detectors may be contained in the chamber C, and be activated simultaneously or indeed only one or some activated and not the others. Those skilled in the art know methods for dividing beams using spectral splitting that make it possible to simultaneously direct to a number of optical detectors, a number of beam portions that are to be separately detected by each of the optical detectors.

Again possibly, the fairing of the self-propelled machine 100 may be designed to evacuate the air flow that passes through the aperture O of the concave mirror 2, in an offset manner toward the rear of the machine 100. In this case, the chamber wall 4a and the fairing wall 4b may be extended to form from the evacuation aperture E, an intermediate evacuation passage that extends, between these walls 4a and 4b, to an exhaust outlet that is located further toward the rear of the machine 100. Superior stability in guiding the machine 100 may be achieved in this way. Generally, in order to disturb the propulsion of the machine 100 as little as possible, it is advantageous for the air flow that is evacuated after having passed through the radiation-collecting assembly 10 to be released from the machine 100 with a velocity component along the A-A axis that has the same sign as the penetration of this flow into the aperture O of the concave mirror 2.

It will be understood that the invention may be reproduced while modifying secondary aspects of the embodiments which have been described in detail above, while retaining at least some of the mentioned advantages. In particular, the window 3 may be divided into a plurality of elementary windows that are distributed around the convex mirror 1. Likewise, separately or in combination, the passage of the air flow between the window 3 and the concave mirror 2 may also be divided, in this case into several flow veins. Furthermore, all the numerical values that have been mentioned have been provided merely by way of illustration, and may be changed depending on the application in question.

The invention claimed is:

1. A radiation-collecting optical assembly designed to form an optical entrance of a seeking device for guiding a self-propelled machine, said collecting optical assembly comprising:

a convex mirror, which has a reflecting face and an optical axis;

a concave mirror, which is placed in front of the reflecting face of the convex mirror and facing said convex mirror, the concave mirror being provided with an aperture through a central portion of said concave mirror, the concave and convex mirrors having same optical axis, and said optical axis passing through the aperture of the concave mirror at a central point of said aperture; and at least one window that is transparent to the radiation, and that extends behind the convex mirror, on a side opposite the reflecting face of said convex mirror, the assembly being designed so that part of an electromagnetic radiation that passes through the aperture of the concave mirror in direction of the convex mirror is reflected by said convex mirror then by the concave mirror, then passes through the window, and then propagates behind the convex mirror, and being further designed so that a fluid that passes through the aperture of the concave mirror in direction of the convex mirror is deviated in front of said convex mirror, thereby acquiring a radial velocity component that is divergent with respect to the optical axis, and then flows between the window and the concave mirror, the convex and concave mirrors being designed and placed so that electromagnetic radiation that passes through the aperture of the concave mirror parallel to the optical axis is focused by the collecting optical assembly on an image point that is located on said optical axis behind the convex mirror.

2. The optical assembly of claim 1, wherein at least one portion of the convex mirror, which is efficient for reflecting the radiation, is comprised of a solid portion of uniform material with a thickness larger than 0.5 mm, or even larger than 1 mm.

3. The optical assembly of claim 1, wherein said at least one window is symmetrically distributed about the optical axis, or comprises a plurality of windows that are symmetrically distributed about the optical axis.

4. The optical assembly of claim 1, wherein the mirrors and the window are designed so that said optical assembly is efficient for collecting electromagnetic radiation having at least one wavelength comprised between 2 µm and 2.5 µm.

5. A seeking device for guiding a self-propelled machine, said device comprising:
the radiation-collecting optical assembly of claim 1;
at least one optical detector, which is arranged to receive the radiation that has passed through the aperture of the concave mirror, that has been reflected by the convex mirror then by the concave mirror, and that has passed then through said at least one window;

a control unit, said control unit being designed to determine a direction of origin of the radiation as existing before said radiation reaches the collecting optical assembly based on at least one signal that is outputted by the optical detector, and being designed to control an orientation of a travel speed of the machine depending on the direction determined for the origin of the radiation; and at least one evacuation aperture, said evacuation aperture being arranged to evacuate the fluid that has passed through the aperture of the concave mirror in direction of the convex mirror, and that has flowed between the window and the concave mirror.

6. The seeking device of claim 5, wherein the collecting optical assembly and the optical detector are arranged and designed so that said seeking device has an apex half-angle of an entrance optical field that is larger than 10°.

7. The seeking device of claim 5, wherein the optical detector is a matrix-array image sensor that is placed in an imaging focal plane.

8. The seeking device of claim 7, wherein the matrix-array image sensor is placed in a focal plane of said collecting optical assembly.

9. A self-propelled machine, comprising the seeking device of claim 5, and arranged to automatically guide a travel of the machine toward a point of origin of the radiation, said machine comprising an evacuation passage arranged to guide, toward an exhaust outlet of the machine, fluid coming from the evacuation aperture of the seeking device, so that said fluid has, at the exhaust outlet, a velocity component that is oriented in a same direction as a velocity of the fluid through the aperture of the concave mirror.

10. The optical assembly of claim 1, wherein the mirrors and the window are designed so that said optical assembly is efficient for collecting electromagnetic radiation having at least one wavelength comprised between 8 µm and 14 µm.

11. The seeking device of claim 5, wherein the collecting optical assembly and the optical detector are arranged and designed so that said seeking device has an apex half-angle of an entrance optical field that is larger than 15°.

12. The seeking device of claim 5, wherein the collecting optical assembly and the optical detector are arranged and designed so that said seeking device has an apex half-angle of an entrance optical field that is larger than 18°.

13. The optical assembly of claim 1, wherein the mirrors and the window are designed so that said optical assembly is efficient for collecting electromagnetic radiation having at least one wavelength comprised between 3 µm and 5 µm.

* * * * *